United States Patent
Yanagida

(10) Patent No.: US 9,343,969 B2
(45) Date of Patent: May 17, 2016

(54) SWITCHING REGULATOR, CONTROL CIRCUIT AND CONTROL METHOD THEREOF, AND ELECTRONIC APPARATUS

(71) Applicant: ROHM CO., LTD., Kyoto (JP)

(72) Inventor: Osamu Yanagida, Kyoto (JP)

(73) Assignee: ROHM CO., LTD. (JP)

( * ) Notice: Subject to any disclaimer, the term of this patent is extended or adjusted under 35 U.S.C. 154(b) by 251 days.

(21) Appl. No.: 14/026,095

(22) Filed: Sep. 13, 2013

(65) Prior Publication Data

US 2014/0070780 A1 Mar. 13, 2014

(30) Foreign Application Priority Data

Sep. 13, 2012 (JP) ................................. 2012-201966

(51) Int. Cl.
*H02M 3/158* (2006.01)
*H02M 1/00* (2006.01)

(52) U.S. Cl.
CPC .... *H02M 3/1588* (2013.01); *H02M 2001/0003* (2013.01); *H02M 2001/0009* (2013.01); *Y02B 70/1466* (2013.01)

(58) Field of Classification Search
CPC ....... H02M 3/156; H02M 3/1588; G05F 1/56; G05F 1/573
USPC ......... 323/271, 274, 275, 277, 278, 282, 284, 323/285
See application file for complete search history.

(56) References Cited

U.S. PATENT DOCUMENTS 7,834,604 B2 * 11/2010 Soenen et al. ................ 323/282
7,990,073 B2 * 8/2011 Feldtkeller .................... 315/291

* cited by examiner

*Primary Examiner* — Yemane Mehari
(74) *Attorney, Agent, or Firm* — Cantor Colburn LLP

(57) ABSTRACT

A control circuit for controlling a switching transistor and a synchronous rectifying transistor of a switching regulator includes: a bottom detection comparator configured to assert an on signal; a timer circuit configured to generate an off signal; a zero current detector configured to assert a zero current detection signal; and a driving circuit configured to receive the on signal, the off signal and the zero current detection signal, and (i) turn on the switching transistor and turn off the synchronous rectifying transistor when the on signal is asserted, (ii) turn off the switching transistor and turn on the synchronous rectifying transistor when the off signal is asserted, and (iii) turn off the switching transistor and the synchronous rectifying transistor when the zero current detection signal is asserted.

14 Claims, 6 Drawing Sheets

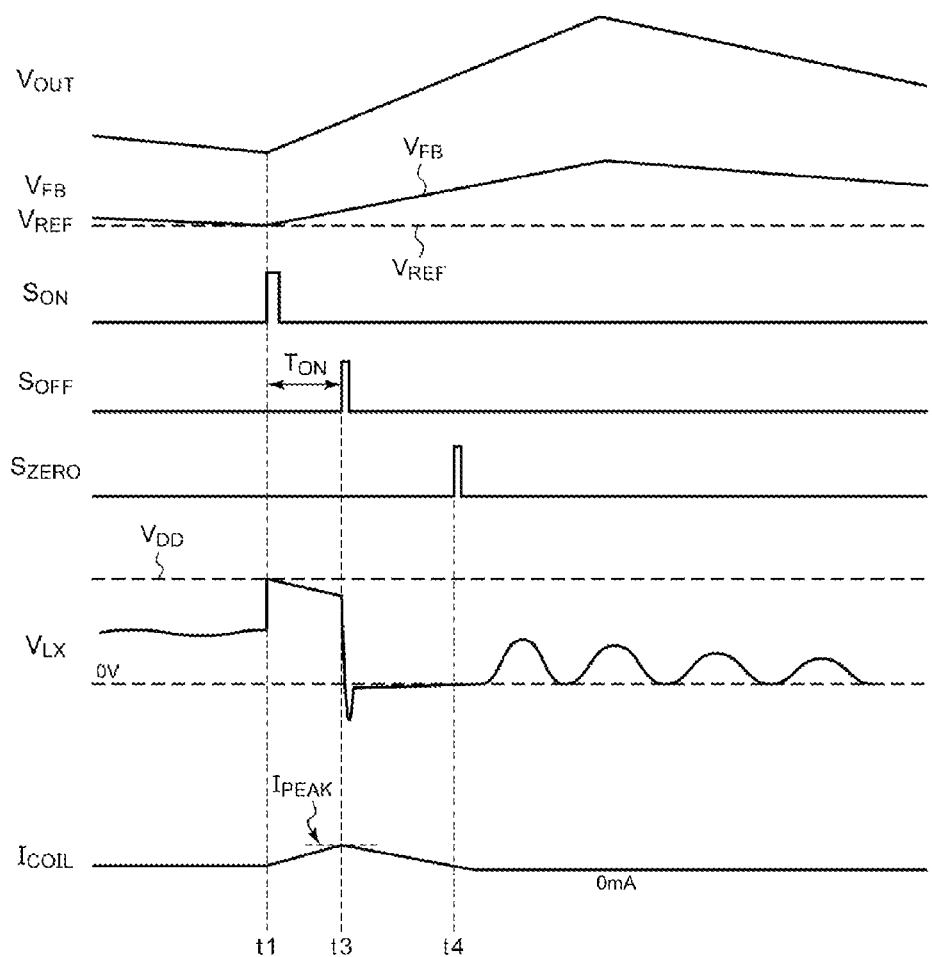

500

600

US 9,343,969 B2

SWITCHING REGULATOR, CONTROL CIRCUIT AND CONTROL METHOD THEREOF, AND ELECTRONIC APPARATUS

CROSS-REFERENCE TO RELATED APPLICATION

This application is based upon and claims the benefit of priority from Japanese Patent Application No. 2012-201966, filed on Sep. 13, 2012, the entire contents of which are incorporated herein by reference.

TECHNICAL FIELD

The present disclosure relates to a switching regulator and a control circuit thereof.

BACKGROUND

Recent electronic apparatuses such as personal digital assistants (PDAs) and so on are equipped with devices requiring a power source voltage higher or lower than a battery voltage. A step-up, step-down or step-up/step-down type switching regulator is used to supply a proper power source voltage to such devices.

FIG. 1 is a circuit diagram showing a switching regulator $4r$. The switching regulator $4r$ includes a control circuit $100r$ and an output circuit 102. The output circuit 102 includes a switching transistor M1, a synchronous rectifying transistor M2, an inductor L1 and an output capacitor C and has a topology of a step-down type switching regulator. The control circuit $100r$ switches the switching transistor M1 and the synchronous rectifying transistor M2 to stabilize an output voltage $V_{OUT}$ to a target value.

The control circuit $100r$ includes a bottom detection comparator 10, a driving circuit $20r$, a peak current detector 50 and a zero current detector 60. A first voltage-dividing resistor R1 and a second voltage-dividing resistor R2 divide the output voltage $V_{OUT}$ to generate a feedback voltage $V_{FB}$ based on the output voltage $V_{OUT}$. The bottom detection comparator 10 compares the feedback voltage $V_{FB}$ with a predetermined reference voltage $V_{REF}$ and generates an on signal $S_{ON}$ asserted (for example, having a high level) when the feedback voltage $V_{FB}$ decreases to the reference voltage $V_{REF}$.

The peak current detector 50 includes a current detector 52 and a peak current detection comparator 54 and generates an off signal $S_{OFF}$ asserted when current $I_{M1}$ flowing into the switching transistor M1 reaches a predetermined peak current $I_{PEAK}$.

In an on period of the switching transistor M1, a voltage $V_{LX}$ of a junction point (a switching terminal LX) of the switching transistor M1 and the synchronous rectifying transistor M2 is given by $V_{DD}-I_{M1} \times R_{ON1}$. Where, $R_{ON1}$ denotes an on resistor of the switching transistor M1. The current detector 52 generates a detection voltage $V_{IM1}$ depending on a voltage drop ($I_{M1} \times R_{ON1}$) of the switching transistor M1. The peak current detection comparator 54 compares the detection voltage $V_{IM1}$ with a threshold voltage $V_{PEAK}$ corresponding to the peak current $I_{PEAK}$ and asserts the off signal $S_{OFF}$ (for example, having a high level) when the detection voltage $V_{IM1}$ reaches the threshold voltage $V_{PEAK}$, in other words, when the current $I_{M1}$ reaches the predetermined peak current $I_{PEAK}$.

The zero current detector 60 generates a zero current detection signal $S_{ZERO}$ asserted when current $I_{M2}$ flowing into the synchronous rectifying transistor M2 decreases to a near-zero threshold value $I_{ZERO}$. In an on period of the synchronous rectifying transistor M2, a voltage $V_{LX}$ of the switching terminal LX is given by $V_{IM2}=-R_{ON2} \times I_{m2}$. Where, $R_{ON2}$ denotes an on resistor of the synchronous rectifying transistor M2. The zero current detector 60 includes a comparator to compare the voltage $V_{LX}$ of the switching terminal LX with a predetermined threshold voltage $V_{ZERO}$.

The driving circuit $20r$ includes a control logic part $22r$ and a pre-driver 24. The control logic part $22r$ receives the on signal $S_{ON}$, the off signal $S_{OFF}$ and the zero current detection signal $S_{ZERO}$ and generates a control signal to direct turning-on/off of the switching transistor M1 and the synchronous rectifying transistor M2. The pre-driver 24 controls the switching transistor M1 and the synchronous rectifying transistor M2 based on the control signal generated by the control logic part $22r$.

When the on signal $S_{ON}$ is asserted, the driving circuit $20r$ turns on the switching transistor M1 and turns off the synchronous rectifying transistor M2. Subsequently, when the off signal $S_{OFF}$ is asserted, the driving circuit $20r$ turns off the switching transistor M1 and turns on the synchronous rectifying transistor M2. Subsequently, when the zero current detection signal $S_{ZERO}$ is asserted, the driving circuit $20r$ turns off both of the switching transistor M1 and the synchronous rectifying transistor M2.

FIG. 2 is an operation waveform diagram of the switching regulator $4r$ of FIG. 1. The bottom detection comparator 10 of FIG. 1 is configured to have a high response speed and a very small delay. At time t1, when the feedback voltage $V_{FB}$ decreases to the reference voltage $V_{REF}$, the on signal $S_{ON}$ is immediately asserted and the switching transistor M1 is turned on.

When the switching transistor M1 is turned on, the voltage $V_{LX}$ of the switching terminal LX rises to the proximity of an input voltage $V_{DD}$. In addition, as coil current $L_{COIL}$ increases, i.e., as the current $L_{M1}$ of the switching transistor M1 increases, a voltage drop of the switching transistor M1 increases and the voltage $V_{LX}$ of the switching terminal LX is being lowered.

At time t2, the voltage drop of the switching transistor M1 reaches the threshold value $V_{PEAK}$. In other words, the voltage $V_{LX}$ of the switching terminal LX decreases to $V_{DD}-V_{PEAK}$.

The peak current detector 50 has response delays, specifically, a delay in the current detector 52 and a delay in the peak current detection comparator 54. Due to the sum $\tau_D$ of these delays, the off signal $S_{OFF}$ is asserted at time t3 after lapse of the delay time $\tau_D$ from time t2. At time t3, the switching transistor M1 is turned off and the synchronous rectifying transistor M2 is turned on. At time t4, when current flowing into the synchronous rectifying transistor M2 decreases to the near-zero threshold value $I_{ZERO}$, both of the switching transistor M1 and the synchronous rectifying transistor M2 are turned off.

In the switching regulator $4r$ of FIG. 1, for the delay time $\tau_D$ between time t2 and time t3, the coil current $I_{COIL}$, i.e., the current $I_{M1}$ of the switching transistor M1, continues to increase and reaches $I_{PEAK}'$. In other words, in order to set the actual peak current $I_{PEAK}'$ of the coil current $I_{COIL}$ to a desired target value, there is a need to determine the peak current $I_{PEAK}$, i.e., a threshold voltage $V_{PEAK}$, in consideration of a length of the delay time $\tau_D$ and a slope of the coil current $I_{COIL}$.

For example, assuming that $V_{DD}=3.7V$, $V_{OUT}=1.7V$, inductance of the inductor L1 is 2.2 µH, $I_{PEAK}'=100$ mA, and $\tau_D=60$ ns, the desired $I_{PEAK}$ is approximately 45.45 mA. Assuming that $R_{ON1}=0.2\Omega$, a voltage drop of the switching transistor M1 is 9.09 mV=$0.2\Omega \times 45.45$ mA. That is, the peak current detector 50 needs to compare the voltage drop, which is likely to be a few millivolts (mV), with the threshold voltage $V_{PEAK}$. However, in actuality, it is difficult to compare the voltage drop in millivolts (mV) with the threshold voltage, which may result in erroneous detection.

SUMMARY

The present disclosure provides various embodiments of a switching regulator which is capable of controlling a peak of coil current with high precision.

According to one embodiment of the present disclosure, there is provided a control circuit for controlling a switching transistor and a synchronous rectifying transistor of a switching regulator. The control circuit includes: a bottom detection comparator configured to assert an on signal when a feedback voltage depending on an output voltage of the switching regulator decreases to a predetermined reference voltage; a timer circuit configured to generate an off signal asserted after lapse of on-time having a length depending on an input voltage and the output voltage of the switching regulator after the on signal is asserted; a zero current detector configured to assert a zero current detection signal when current flowing into the synchronous rectifying transistor decreases to a predetermined threshold value after the off signal is asserted; and a driving circuit configured to receive the on signal, the off signal and the zero current detection signal, and (i) turn on the switching transistor and turn off the synchronous rectifying transistor when the on signal is asserted, (ii) turn off the switching transistor and turn on the synchronous rectifying transistor when the off signal is asserted, and (iii) turn off the switching transistor and the synchronous rectifying transistor when the zero current detection signal is asserted.

With this configuration, since the off signal is generated on the basis of a time measurement by the timer circuit, rather than voltage comparison by a comparator, a peak of the coil current can be controlled with high precision.

The timer circuit may adjust the length of the on-time based on a difference between the input voltage and the output voltage. A slope of the current flowing into the switching transistor, i.e., the coil current, is proportional to a voltage across an inductor (coil) of the switching regulator, i.e., a difference between the input voltage and the output voltage. With this configuration, by changing the on-time in response to the slope of the coil current, even in a situation where at least one of the input voltage and the output voltage is varied, a peak of the coil current can remain constant.

The timer circuit may make the length of the on-time shorter as a difference between the input voltage and the output voltage becomes larger.

The timer circuit may adjust the length of the on-time to be substantially inversely proportional to a difference between the input voltage and the output voltage.

The timer circuit may include: a capacitor; a charging circuit configured to charge the capacitor with current depending on a difference between the input voltage and the output voltage; and a comparator configured to compare a voltage of the capacitor with a predetermined threshold voltage.

The charging circuit may charge the capacitor with current proportional to the difference between the input voltage and the output voltage.

The charging circuit may include a transconductance amplifier having a first input terminal receiving the input voltage and a second input terminal receiving the output voltage.

The charging circuit may include: a reference current source configured to generate reference current; a first transistor which is a P channel MOSFET (Metal Oxide Semiconductor Field Effect Transistor) having a drain electrode connected to the reference current source and a source electrode to which the input voltage is applied; a second transistor which is a P channel MOSFET having a source electrode to which the input voltage is applied, a gate electrode connected to a gate electrode of the first transistor, and a drain electrode connected to an output terminal of the charging circuit; a third transistor which is a P channel MOSFET having a source electrode to which the input voltage is applied, and a gate electrode connected to the gate electrode of the first transistor; and a fourth transistor having a source electrode connected to a drain electrode of the third transistor, a gate electrode to which the output voltage is applied, and a drain electrode connected to the output terminal of the charging circuit.

The timer circuit may include: a capacitor; a charging circuit configured to charge the capacitor with a predetermined current; a variable voltage source configured to generate a threshold voltage depending on a difference between the input voltage and the output voltage; and a comparator configured to compare a voltage of the capacitor with the threshold voltage.

The variable voltage source may generate the threshold voltage substantially inversely proportional to the difference between the input voltage and the output voltage.

The switching regulator may be of a step-down type.

The control circuit is integrated on a single semiconductor substrate. The term "integration" may include a case where all circuit elements are formed on a single semiconductor substrate, a case where some main circuit elements are integrated on a single semiconductor, and a case where some resistors, capacitors and so on are formed out of a semiconductor substrate. When circuits are integrated into a single IC, a circuit area can be reduced and characteristics of circuit elements can be uniformly maintained.

According to another embodiment of the present disclosure, there is provided a switching regulator comprising the above-described control circuit.

According to another embodiment of the present disclosure, there is provided an electronic apparatus comprising the above-described switching regulator.

Other aspects of the present disclosures may include any combinations of the above-described elements or conversion of expression of the present disclosure between methods, apparatuses and so on.

BRIEF DESCRIPTION OF THE DRAWINGS

FIG. 5 is an operation waveform diagram of the switching regulator of FIG. 3.

DETAILED DESCRIPTION

Figure 1:
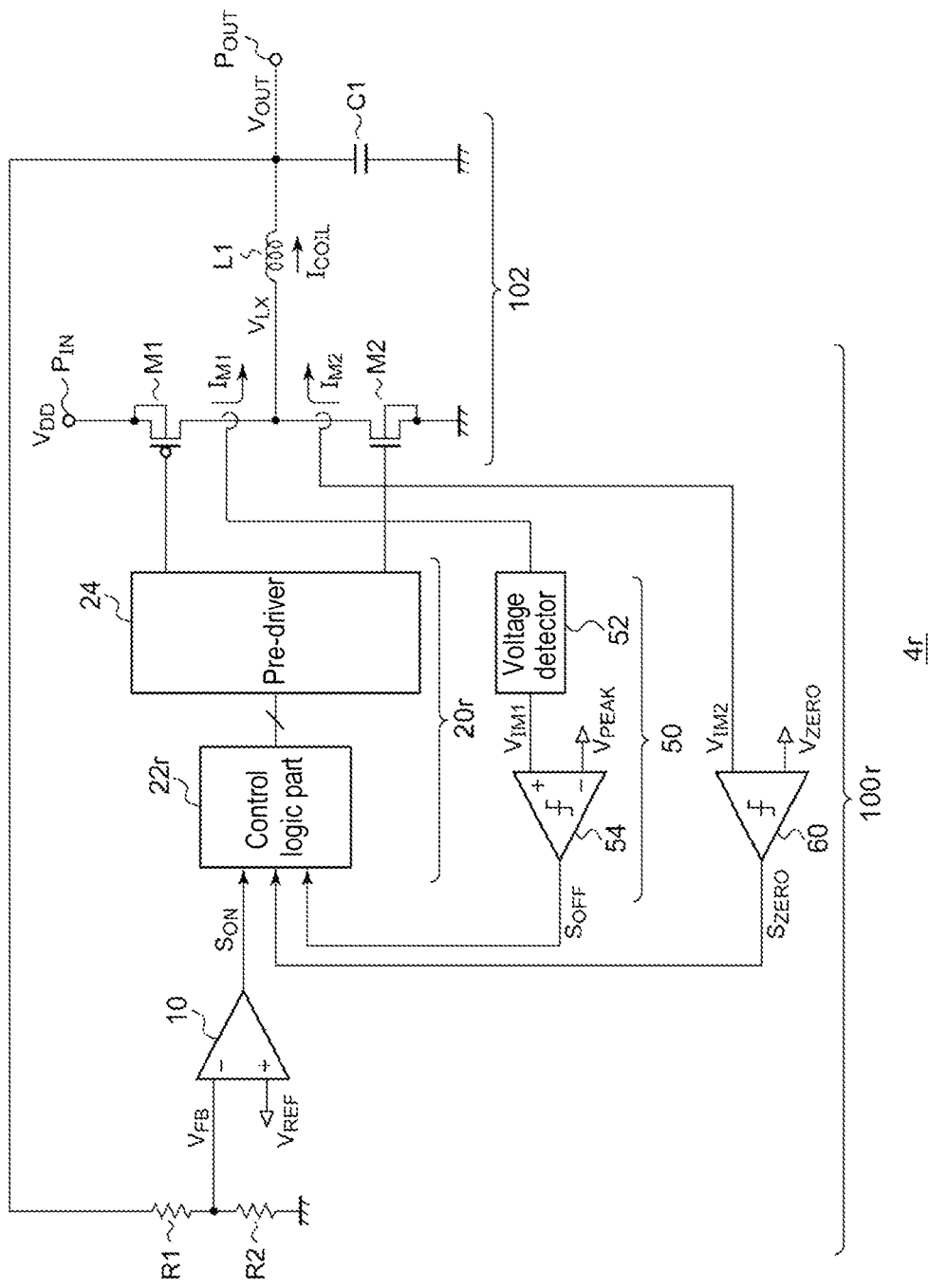
FIG. 1 is a circuit diagram showing a switching regulator.
Figure 2:
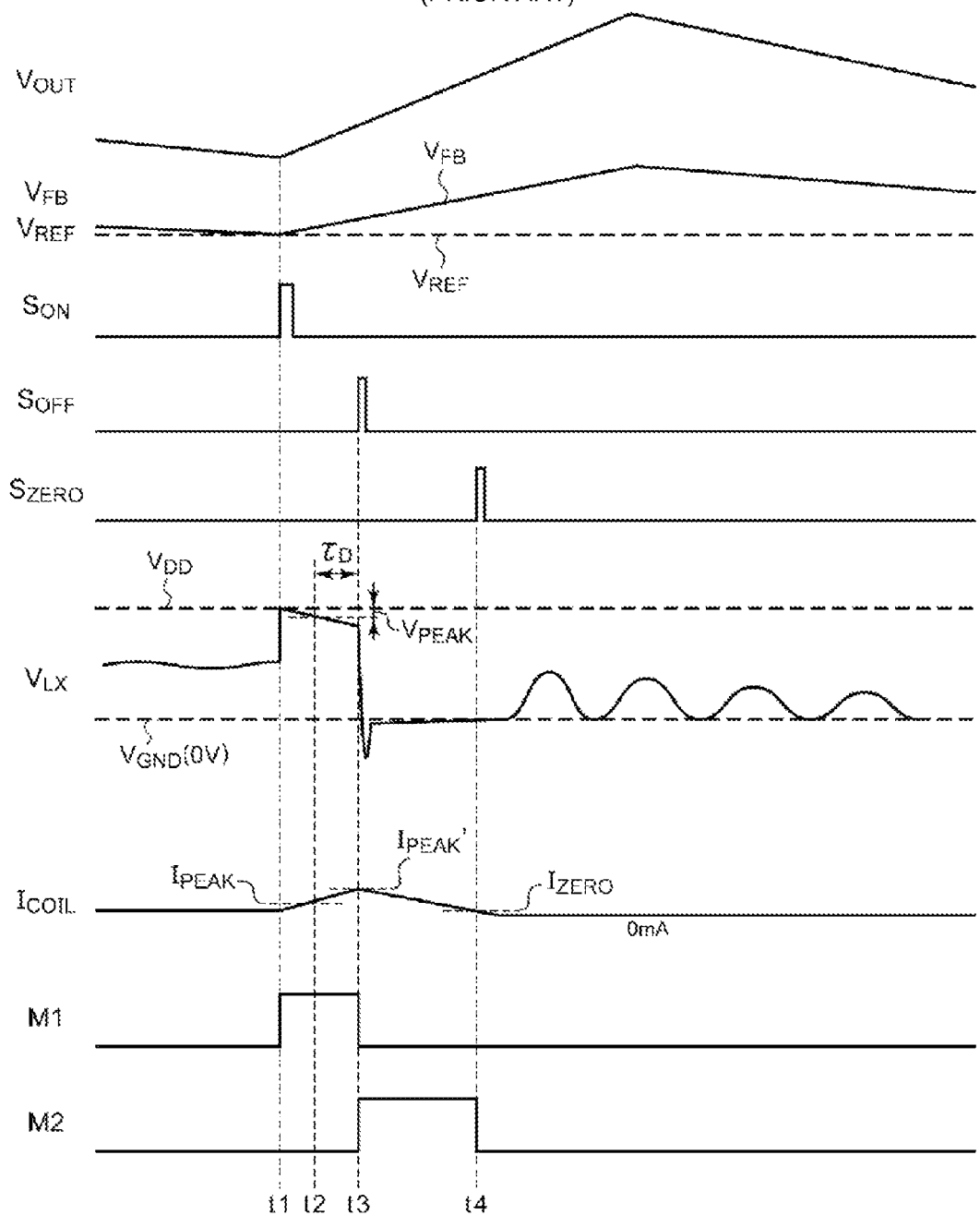
FIG. 2 is an operation waveform diagram of the switching regulator of FIG. 1.

Various embodiments of the present disclosure will now be described in detail with reference to the drawings. Throughout the drawings, the same or similar elements, members and processes are denoted by the same reference numerals and explanations of which will not be repeated. The disclosed embodiments are provided for the purpose of illustration, not limitation, of the present disclosure.

In the specification, the phrase "connection of a member A and a member B" is intended to include direct physical connection of the member A and the member B as well as indirect connection thereof via other member as long as the other member has no substantial effect on the electrical connection of the member A and the member B or has no damage to functions and effects shown by a combination of the member A and the member B. Similarly, the phrase "interposition of a member C between a member A and a member B" is intended to include direct connection of the member A and the member C or direct connection of the member B and the member C as well as indirect connection thereof via other member as long as the other member has no substantial effect on the electrical connection of the member A, the member B and the member C or has no damage to functions and effects shown by a combination of the member A, the member B and the member C.

Figure 3:
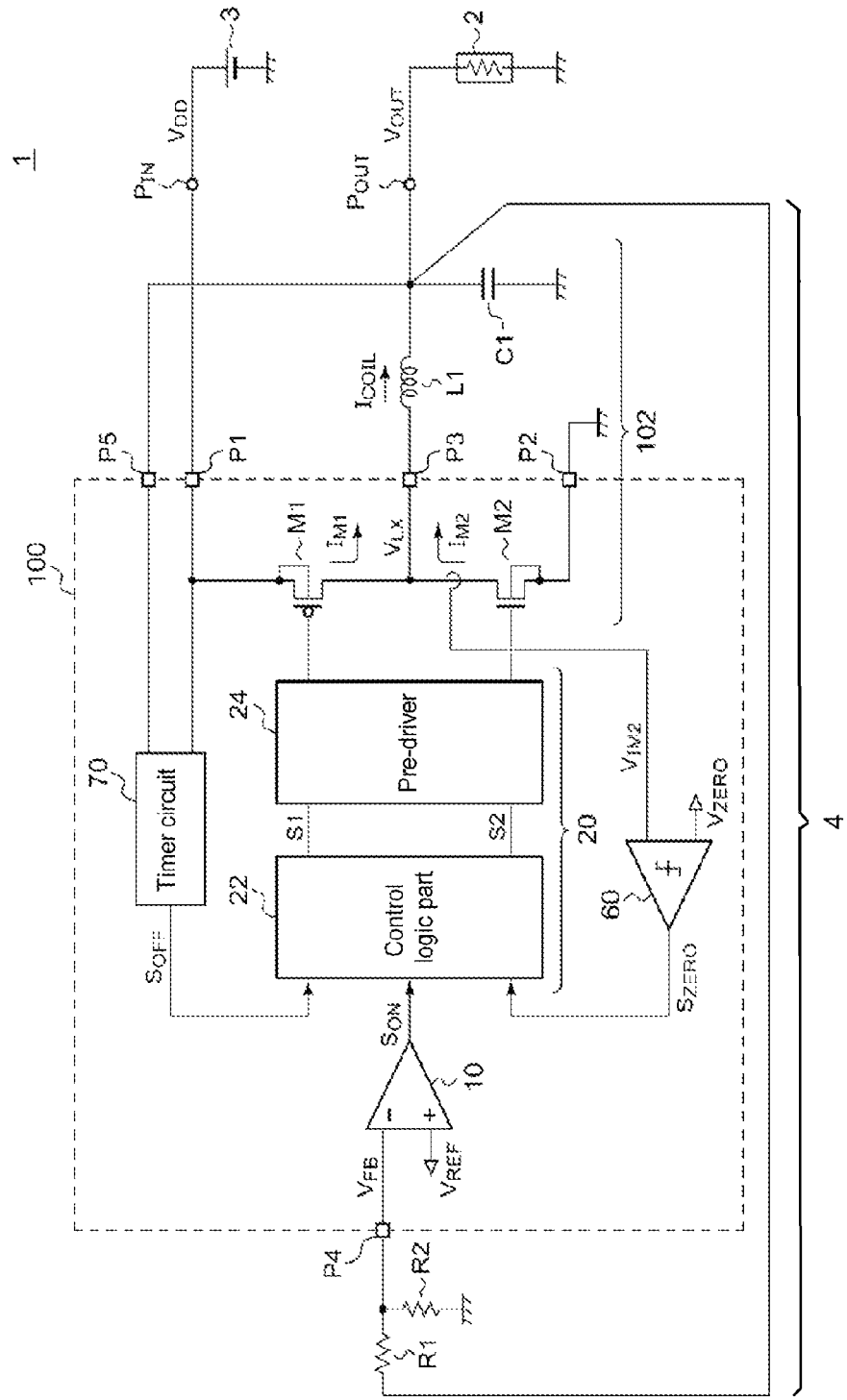
FIG. 3 is a circuit diagram showing a configuration of an electronic apparatus including a switching regulator according to an embodiment.

FIG. 3 is a circuit diagram showing a configuration of an electronic apparatus 1 including a switching regulator 4 according to an embodiment.

The electronic apparatus 1 may be a tablet PC (Personal Computer), a laptop PC, a mobile terminal, a digital camera, a digital video camera, a portable audio player, a PDA (Personal Digital Assistant) or the like. The electronic apparatus 1 includes a load 2, a battery 3 and a switching regulator 4.

The load 2 includes various digital circuits, analog circuits and combinations thereof, including a CPU (Central Processing Unit), a DSP (Digital Signal Processor), a GPU (Graphics Processing Unit), a microcontroller, a memory, a liquid crystal driver, an audio circuit, etc.

The switching regulator 4 receives a power source voltage (also referred to as an input voltage) $V_{DD}$ and steps down the power source voltage to generate a stabilized output voltage $V_{OUT}$ which is then supplied to the load 2. The power source $V_{DD}$ is supplied from the battery 3 or an external power supply (not shown).

The switching regulator 4 includes a control IC 100, an inductor L1, an output capacitor C1, a first voltage-dividing resistor R1 and a second voltage-dividing resistor R2, all of which may be integrated on a single semiconductor substrate.

The control IC 100 drives a switching transistor M1 and a synchronous rectifying transistor M2 based on a feedback voltage $V_{FB}$ depending on an output signal (the output voltage $V_{OUT}$ in this embodiment) of the switching regulator 4 and stabilizes the output voltage $V_{OUT}$ to a desired level.

Although it is illustrated in this embodiment that the switching transistor M1 and the synchronous rectifying transistor M2 are incorporated in the control IC 100, these transistors may be discrete devices installed out of the control IC 100. The switching transistor M1 and the synchronous rectifying transistor M2 may be bipolar transistors.

An output circuit 102 including the switching transistor M1, the synchronous rectifying transistor M2, the inductor L1 and the output capacitor C1 has a topology of a synchronous rectification type switching regulator.

The output capacitor C1 is interposed between an output terminal $P_{OUT}$ and a ground terminal. The inductor L1 is interposed between the output terminal $P_{OUT}$ and a switching terminal P3 of the control IC 100. The input voltage $V_{DD}$ is input to an input terminal P1 of the control IC 100 and a ground terminal P2 is grounded. The first voltage-dividing resistor R1 and the second voltage-dividing resistor R2 divide the output voltage $V_{OUT}$ and provide a feedback voltage $V_{FB}$ depending on the output voltage $V_{OUT}$ to a feedback terminal P4 of the control IC 100.

The control IC 100 includes a bottom detection comparator 10, a driving circuit 20, a zero current detector 60 and a timer circuit 70 in addition to the switching transistor M1 and the synchronous rectifying transistor M2.

The switching transistor M1 and the synchronous rectifying transistor M2 are connected in series between the input terminal P1 and the ground terminal P1. A junction point LX of the switching transistor M1 and the synchronous rectifying transistor M2 is connected to the switching terminal P3.

The bottom detection comparator 10 compares the feedback voltage $V_{FB}$ to a predetermined reference voltage $V_{REF}$ and generates an on signal $S_{ON}$ asserted (for example, having a high level) when the feedback voltage $V_{FB}$ decreases to the reference voltage $V_{REF}$. The bottom detection comparator 10 is configured to have a high speed response.

The output voltage $V_{OUT}$ of the switching regulator 4 is input to an output voltage detection terminal P5. The timer circuit 70 measures the on-time $T_{ON}$ after the on signal $S_{ON}$ is asserted, that is, after the switching transistor M1 is turned on, and generates an off signal $S_{OFF}$ asserted after a lapse of the on-time $T_{ON}$. The timer circuit 70 sets a length of the on-time $T_{ON}$ based on the input voltage $V_{DD}$ and the output voltage $V_{OUT}$ of the switching regulator 4.

The zero current detector 60 asserts a zero current detection signal $S_{ZERO}$ when current IM2 (coil current $I_{COIL}$) flowing into the synchronous rectifying transistor M2 decreases to a near-zero threshold value $I_{ZERO}$ after the synchronous rectifying transistor M2 is turned on with assertion of the off signal $S_{OFF}$. In an on period of the synchronous rectifying transistor M2, a voltage $V_{LX}$ of the switching terminal LX is given by $V_{IM2}=-R_{ON2} \times I_{M2}$. Where, $R_{ON2}$ denotes an on resistor of the synchronous rectifying transistor M2. The zero current detector 60 may include a comparator to compare the voltage $V_{LX}$ of the switching terminal LX with a predetermined threshold voltage $V_{ZERO}$. In addition, the zero current detector 60 may be configured in different ways without being limited to that shown in FIG. 3. For example, a resistor for current detection may be connected in series to the synchronous rectifying transistor M2 and a voltage drop of the resistor may be compared to the threshold voltage $V_{ZERO}$.

The driving circuit 20 includes a control logic part 22 and a pre-driver 24. The control logic part 22 receives the on signal $S_{ON}$, the off signal $S_{OFF}$ and the zero current detection signal $S_{ZERO}$ and generates control signals S1 and S2 to control turning-on/off of the switching transistor M1 and the synchronous rectifying transistor M2. The pre-driver 24 switches the switching transistor M1 and the synchronous rectifying transistor M2 based on the control signals S1 and S2.

The driving circuit 20 (i) turns on the switching transistor M1 and turns off the synchronous rectifying transistor M2 when the on signal $S_{ON}$ is asserted (a first state), (ii) turns off the switching transistor M1 and turns on the synchronous rectifying transistor M2 when the off signal $S_{OFF}$ is asserted (a second state), and (iii) turns off the switching transistor M1 and the synchronous rectifying transistor M2 when the zero current detection signal $S_{ZERO}$ is asserted (a third state). The driving circuit 20 repeats the first to third states and stabilizes the output voltage $V_{OUT}$ to a target value depending on the reference voltage $V_{REF}$.

In the electronic apparatus 1, one or both of the input voltage $V_{DD}$ and the output voltage $V_{OUT}$ may be varied. For example, when the input voltage $V_{DD}$ is supplied from the battery 3, the input voltage $V_{DD}$ decreases as the battery 3 is discharged, whereas the input voltage $V_{DD}$ increases as the battery 3 is charged. In the case of using a lithium ion battery as the battery 3, for example, the input voltage $V_{DD}$ may be varied within a range of 3.2V to 4.2V.

It is also assumed that the output voltage $V_{OUT}$ supplied to the load 2 may be dynamically varied.

A slope of the coil current $I_{COIL}$ is proportional to a voltage across the inductor L1. During an on-period of the switching transistor M1 and an off-period of the synchronous rectifying transistor M2, the input voltage $V_{DD}$ is applied to one end of the inductor L1 and the output voltage $V_{OUT}$ is applied to the other end. That is, the voltage across the inductor L1 becomes $V_{DD}-V_{OUT}$.

In a first state, the coil current $I_{COIL}$ increases with a slope $((V_{DD}-V_{OUT})/L)$. The coil current $I_{COIL}$ has a peak after a lapse of the on-time $T_{ON}$ and the peak current $I_{PEAK}$ is given by the following equation 1.

$$I_{PEAK}=(V_{DD}-V_{OUT})/L \times T_{ON} \qquad \text{[Equation 1]}$$

When at least one of the input voltage $V_{DD}$ and the output voltage $V_{OUT}$ is varied, the peak current $I_{PEAK}$ can remain constant by adjusting the on-time $T_{ON}$ to cancel such variation. That is, the on-time $T_{ON}$ is adjusted to satisfy the following equation 2.

$$T_{ON}=I_{PEAK}/(V_{DD}-V_{OUT}) \times L \qquad \text{[Equation 2]}$$

From a different standpoint, the timer circuit 70 of FIG. 3 adjusts the length of the on-time $T_{ON}$ based on a difference $(V_{DD}-V_{OUT})$ between the input voltage $V_{DD}$ and the output voltage $V_{OUT}$. The timer circuit 70 may make the length of the on-time $T_{ON}$ shorter as the difference $(V_{DD}-V_{OUT})$ between the input voltage $V_{DD}$ and the output voltage $V_{OUT}$ becomes larger. In other words, the timer circuit 70 may adjust the length of the on-time $T_{ON}$ to be substantially inversely proportional to the difference $(V_{DD}-V_{OUT})$ between the input voltage $V_{DD}$ and the output voltage $V_{OUT}$.

FIGS. 4A to 4D are circuit diagrams for illustrating example configurations of the timer circuit 70. A timer circuit 70a of FIG. 4A includes a capacitor C11, a switch SW11, a current source 72 and a comparator 74. The capacitor C11 has one end having a fixed potential and the other end to which the current source 72 is connected. The current source 72 charges the capacitor C11 with charging current $I_{CHG}$ depending on the input voltage $V_{DD}$ and the output voltage $V_{OUT}$. The switch SW11 is provided to initialize a voltage $V_{C11}$ of the capacitor C11 to zero and is switched off as the on-time $T_{ON}$ is started. The comparator 74 compares the voltage $V_{C11}$ of the capacitor C11 with a predetermined threshold voltage $V_{TH}$ and generates an off signal $S_{OFF}$ asserted (for example, having a high level) when the voltage $V_{C11}$ reaches the threshold voltage $V_{TH}$.

The on-time $T_{ON}$ measured from when the switch SW11 is switched off until when the off signal $S_{OFF}$ is asserted is given by the following equation 3.

$$T_{ON}=C11 \times V_{TH}/I_{CHG} \qquad \text{[Equation 3]}$$

The current source 72 may generate the charging current $I_{CHG}$ substantially proportional to the difference voltage $(V_{DD}-V_{OUT})$. Using a proportional coefficient $g_m$, the following equation 4 is established.

$$I_{CHG}=g_m \times (V_{DD}-V_{OUT}) \qquad \text{[Equation 4]}$$

The following equation 5 can be obtained by putting Equation 4 into Equation 3.

$$T_{ON}=C11 \times V_{TH}/\{g_m \times (V_{DD}-V_{OUT})\} \qquad \text{[Equation 5]}$$

In comparison between Equation 2 and Equation 5, the peak of the coil current $I_{COIL}$ can be set to a desired value $I_{PEAK}$ by adjusting the capacitance of the capacitor C11, the threshold value $V_{TH}$ and the proportional coefficient $g_m$, as can be seen from the following equation 6.

$$I_{PEAK}/L=C11 \times V_{TH}/g_m \qquad \text{[Equation 6]}$$

Figure 4A:
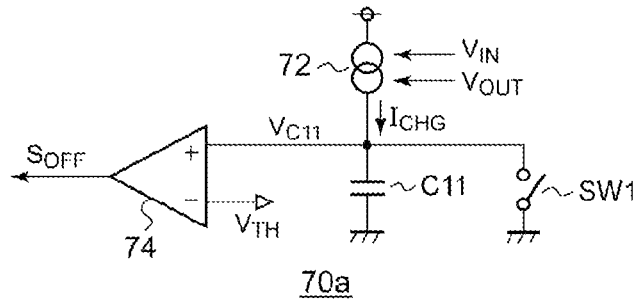
FIGS. 4A to 4D are circuit diagrams for illustrating an example configuration of a timing circuit.
Figure 4B:
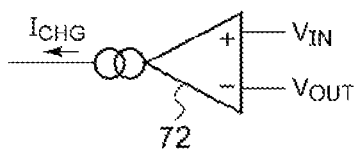

FIG. 4B is a circuit diagram showing an example configuration of the current source 72 of FIG. 4A. The current source 72 includes a transconductance (gm) amplifier and outputs the current $I_{CHG}$ depending on the voltage difference $(V_{DD}-V_{OUT})$, more specifically, outputs the current $I_{CHG}$ substantially proportional to the voltage difference $(V_{DD}-V_{OUT})$. A proportional coefficient corresponds to mutual conductance $g_m$ of the transconductance amplifier.

Figure 4C:
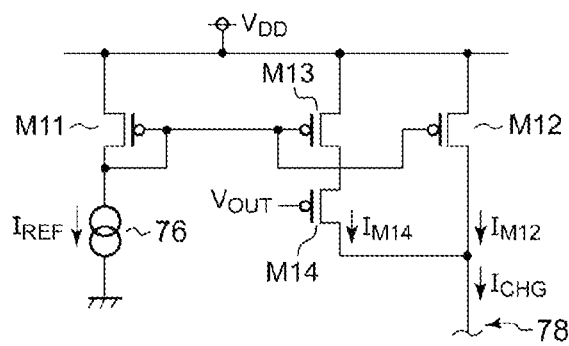

FIG. 4C is a circuit diagram showing another example configuration of the current source 72 of FIG. 4A. The current source 72 includes first to fourth transistors M11 to M14, which are P channel MOSFETs, and a reference current source 76. The reference current source 76 generates a predetermined reference current $I_{REF}$. The first to third transistors M11 to M13 form a current mirror circuit and have their respective source electrodes to which the input voltage $V_{DD}$ is applied. The fourth transistor M14 is interposed between the third transistor M13 and an output terminal 78 of the current source 72 and has its gate electrode to which the output voltage $V_{OUT}$ is applied.

Current $I_{M14}$ flowing into the fourth transistor M14 becomes larger as a difference between $V_{DD}$ and $V_{OUT}$ becomes larger. The current $I_{M14}$ is added to current $I_{M12}$ flowing into the second transistor $M_{12}$ to generate the charging current $I_{CHG}$. Although the charging current $I_{CHG}$ is not completely proportional to the voltage difference between $V_{DD}$ and $V_{OUT}$ the charging current $I_{CHG}$ can be used for the timer circuit 70a since this current depends on the voltage difference between VDD and $V_{OUT}$.

Figure 4D:
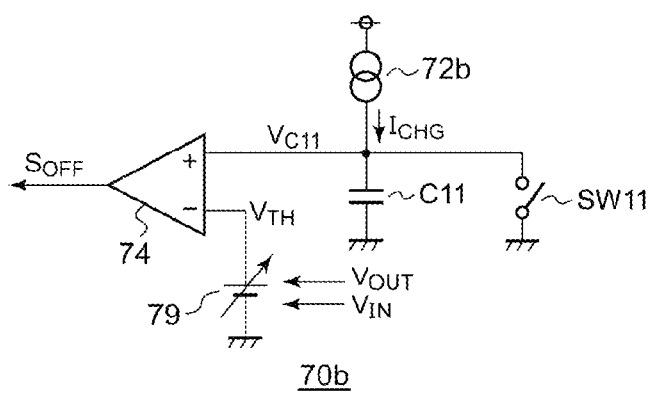

FIG. 4D shows another configuration of the timer circuit. A timer circuit 70b has the same basic configuration as the timer circuit 70a of FIG. 4A. However, a current source 72b generates a predetermined charging current $I_{CHG}$ in a different way as described below. A variable voltage source 79 generates a threshold voltage $V_{TH}$ based on the difference between the input voltage $V_{DD}$ and the output voltage $V_{OUT}$.

The on-time $T_{ON}$ measured form when the switch SW11 is switched off until when the off signal $S_{OFF}$ is asserted is given by the above equation 3.

The variable voltage source 79 may generate a threshold voltage $V_{TH}$ decreasing with increase in the difference voltage $(V_{DD}-V_{OUT})$. In other words, the threshold voltage $V_{TH}$ may be substantially inversely proportional to the difference voltage $(V_{DD}-V_{OUT})$. Using an inverse-proportional coefficient, $k_m$, the following equation 7 is established.

$$V_{TH}=k_m/(V_{DD}-V_{OUT}) \qquad \text{[Equation 7]}$$

The following equation 8 can be obtained by putting Equation 7 into Equation 3.

$$T_{ON}=C11 \times k_m/(V_{DD}-V_{OUT})/I_{CHG} \qquad \text{[Equation 8]}$$

In comparison between Equation 2 and Equation 8, the peak of the coil current $I_{COIL}$ can be set to a desired value $I_{PEAK}$ by adjusting the capacitance of the capacitor C11, the charging current $I_{CHG}$ and the coefficient $k_m$, as can be seen from the following equation 9.

$$I_{PEAK}/L=C_{11} \times k_m/I_{CHG} \qquad \text{[Equation 9]}$$

The configuration of the variable voltage source 79 is not particularly limited but may employ circuits known or to be developed in future.

Subsequently, operation of the switching regulator 4 will be described. FIG. 5 is an operation waveform diagram of the switching regulator 4 of FIG. 3. At time t1, when the feedback voltage $V_{FB}$ decreases to the reference voltage $V_{REF}$, the on signal $S_{ON}$ is asserted. Due to this assertion, the switching regulator 4 transitions the first state, the switching transistor M1 is turned on and the synchronous rectifying transistor M2 is turned off.

When the switching regulator 4 transitions to the first state, the on-time $T_{ON}$ is measured by the timer circuit 70 and the off signal $S_{OFF}$ is asserted at time t3 after lapse of the on-time $T_{ON}$. Due to this assertion, the switching regulator 4 transitions to the second state Φ2, the switching transistor M1 is turned off and the synchronous rectifying transistor M2 is turned on.

At time t4, the zero current detection signal $S_{ZERO}$ is asserted when coil current $I_{COIL}$ ($I_{M2}$) flowing into the synchronous rectifying transistor M2 decreases to a near-zero threshold value $I_{ZERO}$. Due to this assertion, the switching regulator 4 transitions the second state Φ3, both of the switching transistor M1 and the synchronous rectifying transistor M2 are turned off.

The switching regulator 4 has advantages over the switching regulator 4r of FIG. 1.

In the switching regulator 4r of FIG. 1, the actual peak $I_{PEAK}$ of the coil current $I_{COIL}$ is affected by the delay $\tau_D$ of the peak current detector 50 generating the off signal $S_{OFF}$. That is, the input voltage $V_{DD}$ and the output voltage $V_{OUT}$ are varied and a slope of the coil current $I_{COIL}$ for the delay time $\tau_D$ is changed depending on the input voltage $V_{DD}$ and the output voltage $V_{OUT}$. Accordingly, an amount of increase of the coil current $I_{COIL}$ in the delay time $\tau_D$ and further the actual peak current $I_{PEAK}$ are also varied depending on the input voltage $V_{DD}$ and the output voltage $V_{OUT}$. When the peak current $I_{PEAK}$ is varied, a ripple width of the output voltage $V_{OUT}$ is also varied to reduce stabilization of the output voltage $V_{OUT}$.

In contrast, according to the switching regulator 4 of FIG. 3, since the timer circuit 70 generates the off signal $S_{OFF}$ by measuring the on-time $T_{ON}$, it is possible to exclude an effect by a delay as in the peak current detector 50. In addition, although the peak current is also changed by an offset of the peak current detection comparator 54 in the peak current detector 50, such an affect by the offset can be excluded in the switching regulator 4 of FIG. 3.

In addition, by adjusting the on-time $T_{ON}$ based on the input voltage $V_{DD}$ and the output voltage $V_{OUT}$, the peak current $I_{PEAK}$, i.e., a current ripple, can remain constant and a ripple amount of the output voltage $V_{OUT}$ can also remain constant.

Heretofore, the present disclosure has been described by way of specific embodiments. The disclosed embodiments are merely examples and it is to be understood by those skilled in the art that combinations of elements and processes of the embodiments can be modified in various ways and such modification falls within the scope of the present disclosure. The following description is given to such modification.

(First Modification)

There is no need for the on-time $T_{ON}$ to be completely inversely proportional to the difference between the input voltage $V_{DD}$ and the output voltage $V_{OUT}$. Even in a deviation from such an inverse proportion relationship, by making the on-time $T_{ON}$ shorter as the difference between the input voltage $V_{DD}$ and the output voltage $V_{OUT}$ becomes larger, variation of the peak current $I_{PEAK}$ can be more effectively suppressed in comparison to fixed on-time $T_{ON}$.

(Second Modification)

Although it has been illustrated in the above embodiments that the on-time $T_{ON}$ is changed depending on the input voltage $V_{DD}$ and the output voltage $V_{OUT}$, the on-time $T_{ON}$ may be fixed if variation of the difference between the input voltage $V_{DD}$ and the output voltage $V_{OUT}$ is small. Even in this case, the peak current can be correctly controlled since it is not affected by the delay time of the peak current detector 50, as opposed to the switching regulator 4r of FIG. 1.

(Third Modification)

Although a step-down type switching regulator has been illustrated in the above embodiments, the present disclosure is not limited thereto but may be applied to a step-up type or step-up/step-down type switching regulator. In such a step-up type or step-up/step-down type switching regulator, a topology of the output circuit 102 need to be changed.

Figure 6A:
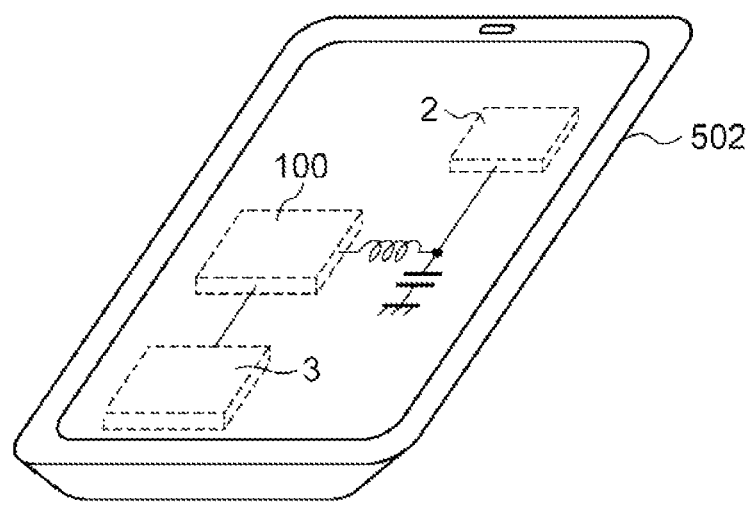
FIGS. 6A and 6B are schematic views showing an electronic apparatus equipped with the switching regulator.
Figure 6B:
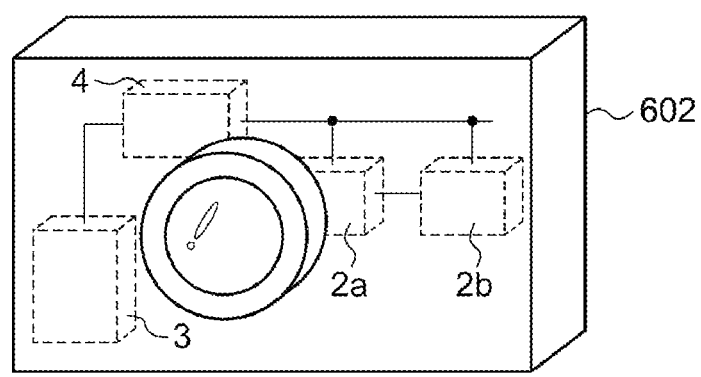

Finally, an example of the electronic apparatus 1 will be described. FIGS. 6A and 6B are schematic views showing an electronic apparatus equipped with the switching regulator 4. An electronic apparatus 500 of FIG. 6A is a tablet PC, a portable game machine or a portable audio player and has a housing 502 in which the battery 3, the switching regulator 4 (the control IC 100) and the load 2 are incorporated. The load 2 is, for example, a CPU.

An electronic apparatus 600 of FIG. 6B is a digital camera and has a housing 602 in which the battery 3, the switching regulator 4, an imaging device 2a, an image processor 2b and so on are incorporated. The switching regulator 4 supplies a power source voltage to the imaging device 2a and the image processor 2b.

According to the present disclosure in some embodiments, it is possible to provide a switching regulator which is capable of controlling a peak of coil current with high precision.

While certain embodiments have been described, these embodiments have been presented by way of example only, and are not intended to limit the scope of the disclosures. Indeed, the novel methods and apparatuses described herein may be embodied in a variety of other forms; furthermore, various omissions, substitutions and changes in the form of the embodiments described herein may be made without departing from the spirit of the disclosures. The accompanying claims and their equivalents are intended to cover such forms or modifications as would fall within the scope and spirit of the disclosures.

What is claimed is:

1. A control circuit for controlling a switching transistor and a synchronous rectifying transistor of a switching regulator, comprising:
   a bottom detection comparator configured to assert an on signal when a feedback voltage depending on an output voltage of the switching regulator decreases to a predetermined reference voltage;
   an input terminal to which an input voltage of the switching regulator is input;
   an output voltage detection terminal to which the output voltage of the switching regulator is input;
   a timer circuit configured to generate an off signal asserted after lapse of on-time having a length depending on the input voltage input from the input terminal and the output voltage input from the output voltage detection terminal after the on signal is asserted, the timer circuit being connected to the input terminal and the output voltage detection terminal;
   a zero current detector configured to assert a zero current detection signal when current flowing into the synchronous rectifying transistor decreases to a predetermined threshold value after the off signal is asserted; and a driving circuit configured to receive the on signal, the off signal and the zero current detection signal, and (i) turn on the switching transistor and turn off the synchronous rectifying transistor when the on signal is asserted, (ii) turn off the switching transistor and turn on the synchronous rectifying transistor when the off signal is asserted, and (iii) turn off the switching transistor and the synchronous rectifying transistor when the zero current detection signal is asserted.

2. The control circuit of claim 1, wherein the timer circuit adjusts the length of the on-time based on a difference between the input voltage and the output voltage.

3. The control circuit of claim 2, wherein the timer circuit makes the length of the on-time shorter as a difference between the input voltage and the output voltage becomes larger.

4. The control circuit of claim 2, wherein the timer circuit adjusts the length of the on-time to be substantially inversely proportional to a difference between the input voltage and the output voltage.

5. The control circuit of claim 2, wherein the timer circuit includes:
 a capacitor;
 a charging circuit configured to charge the capacitor with current depending on a difference between the input voltage and the output voltage; and
 a comparator configured to compare a voltage of the capacitor with a predetermined threshold voltage.

6. The control circuit of claim 5, wherein the charging circuit charges the capacitor with current proportional to the difference between the input voltage and the output voltage.

7. The control circuit of claim 5, wherein the charging circuit includes a transconductance amplifier having a first input terminal receiving the input voltage and a second input terminal receiving the output voltage.

8. The control circuit of claim 5, wherein the charging circuit includes:
 a reference current source configured to generate reference current;
 a first transistor which is a P channel MOSFET (Metal Oxide Semiconductor Field Effect Transistor) having a drain electrode connected to the reference current source and a source electrode to which the input voltage is applied;
 a second transistor which is a P channel MOSFET having a source electrode to which the input voltage is applied such that a source voltage of the second transistor becomes equal to a source voltage of the first transistor, a gate electrode connected to a gate electrode of the first transistor such that a gate voltage of the second transistor becomes equal to a gate voltage of the first transistor, and a drain electrode connected to an output terminal of the charging circuit;
 a third transistor which is a P channel MOSFET having a source electrode to which the input voltage is applied such that a source voltage of the third transistor becomes equal to the source voltage of the first transistor, and a gate electrode connected to the gate electrode of the first transistor such that a gate voltage of the third transistor becomes equal to the gate voltage of the first transistor; and
 a fourth transistor having a source electrode connected to a drain electrode of the third transistor, a gate electrode to which the output voltage is applied, and a drain electrode connected to the output terminal of the charging circuit.

9. The control circuit of claim 2, wherein the timer circuit includes:
 a capacitor;
 a charging circuit configured to charge the capacitor with a predetermined current;
 a variable voltage source configured to generate a threshold voltage depending on a difference between the input voltage and the output voltage; and
 a comparator configured to compare a voltage of the capacitor with the threshold voltage.

10. The control circuit of claim 9, wherein the variable voltage source generates the threshold voltage substantially inversely proportional to the difference between the input voltage and the output voltage.

11. The control circuit of claim 1, wherein the switching regulator is of a step-down type.

12. The control circuit of claim 1, wherein the control circuit is integrated on a single semiconductor substrate.

13. A switching regulator comprising a control circuit of claim 1.

14. An electronic apparatus comprising the switching regulator of claim 13.

* * * * *